United States Patent
Nishimoto et al.

(10) Patent No.: US 9,885,851 B2
(45) Date of Patent: Feb. 6, 2018

(54) ADVANCED OPTICAL GIMBAL

(71) Applicant: Lockheed Martin Corporation, Bethesda, MD (US)

(72) Inventors: Vance Akira Nishimoto, Granada Hills, CA (US); Mike Ivor Jones, Azle, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 15/159,022

(22) Filed: May 19, 2016

(65) Prior Publication Data
US 2017/0336596 A1    Nov. 23, 2017

(51) Int. Cl.
G02B 7/18      (2006.01)
G02B 7/182     (2006.01)
G02B 27/00     (2006.01)
G02B 26/10     (2006.01)

(52) U.S. Cl.
CPC ............. *G02B 7/1821* (2013.01); *G02B 7/18* (2013.01); *G02B 7/182* (2013.01); *G02B 7/1824* (2013.01); *G02B 26/101* (2013.01); *G02B 27/0068* (2013.01)

(58) Field of Classification Search
CPC .... G02B 26/101; G02B 27/0068; G02B 7/18; G02B 7/181; G02B 7/182; G02B 7/1821; G02B 7/1824
USPC ......................................... 359/876, 871, 872
See application file for complete search history.

(56) References Cited

U.S. PATENT DOCUMENTS

| 4,386,848 | A | * | 6/1983 | Clendenin | ............... F41G 3/165 244/3.13 |
|---|---|---|---|---|---|
| 4,717,822 | A | | 1/1988 | Byren | |
| 4,886,330 | A | | 12/1989 | Linick | |
| 5,143,334 | A | | 9/1992 | Sardou et al. | |
| 5,262,630 | A | | 11/1993 | Kordulla | |
| 5,383,645 | A | | 1/1995 | Pedut et al. | |
| 5,751,460 | A | | 5/1998 | Harrell et al. | |
| 5,936,771 | A | | 8/1999 | Cooper | |
| 6,129,307 | A | | 10/2000 | Deoms et al. | |

(Continued)

FOREIGN PATENT DOCUMENTS

| EP | 1965225 A2 | 9/2008 |
|---|---|---|
| WO | WO 2007/033033 A2 | 3/2007 |

OTHER PUBLICATIONS

Extended European Search Report; European Patent Office; Appl, No. 17169151,2-1562; Ref. JL88964P.EPP; 7 pages; dated Nov. 20, 2017.

*Primary Examiner* — William R Alexander
(74) *Attorney, Agent, or Firm* — Baker Botts L.L.P.

(57) ABSTRACT

In certain embodiments, a gimbal assembly includes an enclosure, a window, and a pivot assembly. The enclosure is centered on a first axis and the window is coupled to the enclosure. The pivot assembly is coupled to an interior portion of the enclosure and configured to pivot within the enclosure about a second axis, the second axis being perpendicular to the first axis. The pivot assembly includes a base portion, a mirror coupled at an angle to the base portion and configured to reflect light received through the window, and a sensor configured to receive the light reflected by the mirror. The pivot assembly is further configured to move within the enclosure in a direction that is perpendicular to the first axis and rotate about the first axis.

18 Claims, 4 Drawing Sheets

(56) References Cited

U.S. PATENT DOCUMENTS

| | | |
|---|---|---|
| 6,201,232 B1 | 3/2001 | Carlisle |
| 6,219,593 B1 | 4/2001 | Kroncke |
| 6,226,125 B1 | 5/2001 | Levy et al. |
| 6,779,753 B2 | 8/2004 | Baumann et al. |
| 6,878,923 B2 | 4/2005 | Casteleiro |
| 6,879,447 B2 | 4/2005 | Casteleiro |
| 6,894,818 B1 | 5/2005 | Cicchiello et al. |
| 7,307,771 B2 | 12/2007 | Foote |
| 7,311,409 B2 | 12/2007 | Jackson |
| 7,556,389 B2 | 7/2009 | Cook |
| 7,880,865 B2 | 2/2011 | Tanaka et al. |
| 7,982,662 B2 | 7/2011 | Shaffer |
| 8,635,938 B2 | 1/2014 | King et al. |
| 2002/0143252 A1* | 10/2002 | Dunne ................. B06B 1/04 600/437 |
| 2004/0218287 A1* | 11/2004 | Casteleiro ............. F41G 3/22 359/819 |
| 2007/0008514 A1 | 1/2007 | Krasutsky |
| 2007/0177288 A1* | 8/2007 | Foote ................ G02B 26/105 359/877 |

\* cited by examiner

ADVANCED OPTICAL GIMBAL

TECHNICAL FIELD

The present disclosure relates generally to a gimbal assembly, and more specifically to an advanced optical gimbal assembly.

BACKGROUND

A standard optical gimbal mounted to an aircraft may include one or more optical sensors. Standard optical gimbals have look down capability, which can limit the field of regard. Further, the sensing capability of standard optical gimbals may be limited by obscurations.

SUMMARY

In accordance with the present disclosure, disadvantages and problems associated with standard optical gimbals may be reduced or eliminated.

In one embodiment, a gimbal assembly includes an enclosure, a window frame, a window, one or more guide rails, and a pivot assembly. The enclosure is centered on a first axis. The window frame is coupled to the enclosure and the window is centered on the first axis and coupled to the window frame of the enclosure. The one or more guide rails are coupled within the enclosure to an interior portion of the enclosure. The pivot assembly is coupled to the interior portion of the enclosure and configured to pivot within the enclosure about a second axis using the one or more guide rails, the second axis being perpendicular to the first axis. The pivot assembly includes a base portion, a mirror, and a sensor. The mirror is coupled at an angle to the base portion and configured to reflect light received through the window and the sensor is removably coupled to the base portion and configured to receive the light reflected by the mirror. The second axis is located proximate to an end of the base portion and proximate to an end of the mirror, and the pivot assembly is further configured to move within the enclosure in a direction that is perpendicular to the first axis and rotate about the first axis.

In some embodiments, a gimbal assembly includes an enclosure, a window coupled to the enclosure, and a pivot assembly coupled to an interior portion of the enclosure. The enclosure is configured to rotate about a first axis and the pivot assembly is configured to pivot within the enclosure about a second axis, the second axis being perpendicular to the first axis. The pivot assembly includes a base portion, a mirror coupled at an angle to the base portion and configured to reflect light received through the window, and a sensor configured to receive the light reflected by the mirror.

In certain embodiments, a gimbal assembly includes a pivot assembly configured to be coupled to an interior portion of an enclosure. The pivot assembly is further configured to rotate about a first axis and to pivot within the enclosure about a second axis. The pivot assembly includes a base portion, a mirror coupled at an angle to the base portion and configured to reflect light received through a window of the enclosure, and a payload receptacle configured to house a sensor for receiving the light reflected by the mirror.

Technical advantages of the present disclosure include a gimbal assembly that provides an improved field of regard over standard gimbal installations in special applications. In some embodiments, a 360 degree rotation of the pivot assembly about a first axis and a 45 degree rotation of the pivot assembly about a second axis provides the sensor with a 90 degree unobstructed field of regard. In certain embodiments, the gimbal's pivot assembly is configured to move within the enclosure in a direction perpendicular to the first axis, which allows the pivot assembly to rotate beyond 45 degrees to provide a field of regard greater than 90 degrees. In certain embodiments, obscurations caused by window frames are reduced or eliminated.

As another advantage, certain embodiments of the present disclosure improve vehicle volume utilization. For example, a gimbal assembly may provide an unobstructed 90 degree field of regard with a single sensor, which eliminates the need to house multiple sensors. Further, in some embodiments, the gimbal assembly and its components are scalable. For example, the size of the gimbal assembly may be reduced for smaller aircraft platform (e.g., a four-seat, single-engine aircraft). Another technical advantage includes the gimbal assembly's ability to avoid gimbal lock in certain embodiments. For example, the gimbal assembly's first axis of rotation may be configured to tilt to avoid gimbal lock.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION OF THE DISCLOSURE

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 5, where like numbers are used to indicate like and corresponding parts.

Standard optical gimbals used by aircraft may include one or more optical sensors. Standard optical gimbals have look down capability, which can limit the field of regard. Further, the sensing capability of standard optical gimbals may be limited by obscurations.

To reduce or eliminate these and other problems, some embodiments of the present disclosure include a gimbal assembly that provides an improved field of regard over standard gimbal installations in special applications. In some embodiments, a 360 degree rotation of the pivot assembly about a first axis and a 45 degree rotation of the pivot assembly about a second axis provides the sensor with a 90 degree unobstructed field of regard. In certain embodiments, the gimbal's pivot assembly is configured to move within the enclosure in a direction perpendicular to the first axis, which allows the pivot assembly to rotate beyond 45 degrees to provide a field of regard greater than 90 degrees. In certain embodiments, obscurations caused by window frames are reduced or eliminated.

As another advantage, certain embodiments of the present disclosure improve vehicle volume utilization. For example, a gimbal assembly may provide an unobstructed 90 degree field of regard with a single sensor, which eliminates the need to house multiple sensors. Further, in some embodiments, the gimbal assembly and its components are scalable. For example, the size of the gimbal assembly may be reduced for smaller aircraft platform (e.g., a four-seat, single-engine aircraft). Another technical advantage includes the gimbal assembly's ability to avoid gimbal lock in certain embodiments. For example, the gimbal assembly's enclosure may be configured to tilt to avoid gimbal lock.

Other technical advantages will be readily apparent to one skilled in the art from the following figures, descriptions, and claims. Moreover, while specific advantages have been enumerated above, various embodiments may include all, some, or none of the enumerated advantages. FIGS. 1-5 provide additional details relating to a gimbal assembly.

Figure 1:
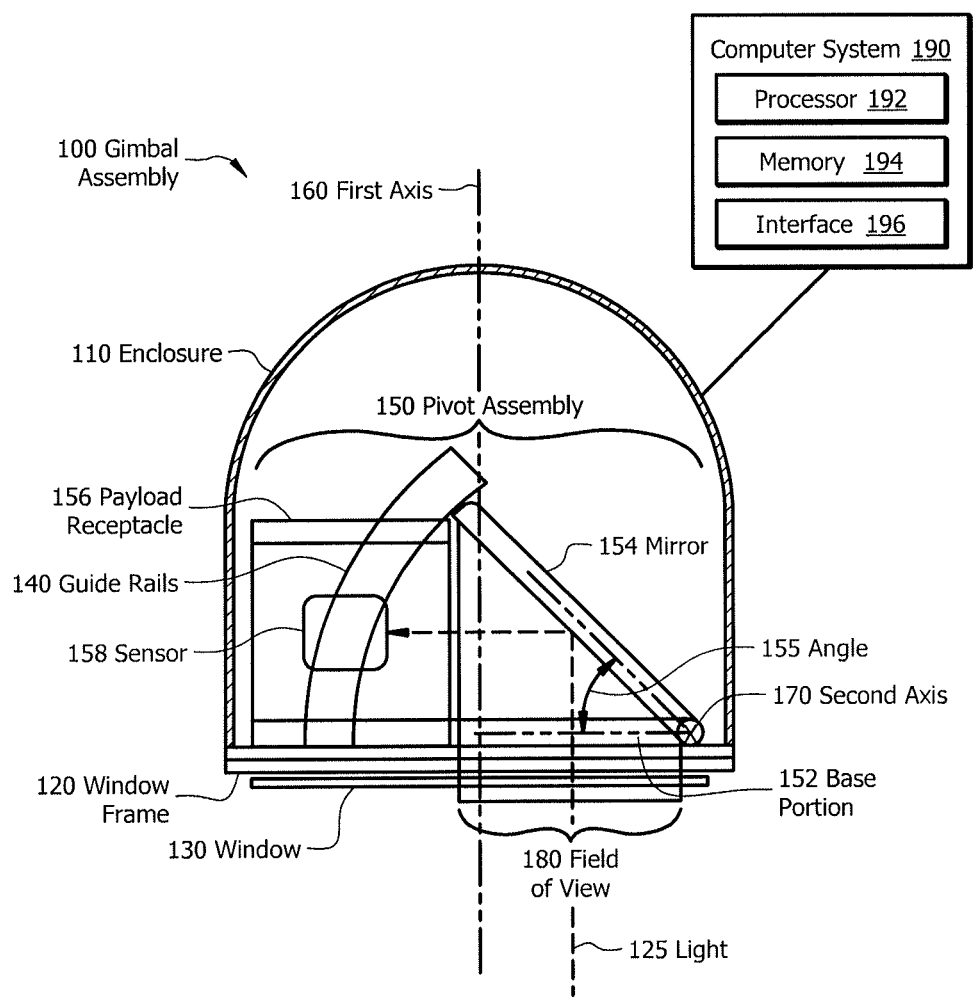
FIG. 1 illustrates an elevation view of a gimbal assembly, according to certain embodiments.

FIG. 1 illustrates an elevation view of a gimbal assembly 100, according to certain embodiments. As shown in the embodiment of FIG. 1, gimbal assembly 100 includes an enclosure 110, a window frame 120, a window 130, guide rails 140, and a pivot assembly 150. In certain embodiments, gimbal assembly 100 is mounted on a vehicle (e.g., an aircraft). In some embodiments, gimbal assembly 100 and its components are scalable. As an example, for gimbal assembly 100 mounted on an aircraft platform, the size of gimbal assembly 100 and its corresponding components may depend on the size of the aircraft platform.

In general, gimbal assembly 100 is an optical gimbal that may be installed on an aircraft to track objects. Whereas a sensor of a typical gimbal assembly looks straight ahead and receives light directly as the gimbal rotates about its mount, a sensor of gimbal assembly 100 takes a different approach by receiving light reflected by a mirror. The mirror and sensor rotate and pivot within a limited space of enclosure 110 to improve the field of regard over standard gimbal installations without wasting space on the aircraft's platform.

Enclosure 110 is any enclosure configured to enclose pivot assembly 150. Enclosure 110 may be any shape or form. In the illustrated embodiment of FIG. 1, gimbal assembly 100 includes a dome-shaped enclosure 110 with a circular base. In some embodiments, enclosure 110 is configured to withstand loading conditions. For example, enclosure 110 may be configured to withstand static and/or dynamic loads associated with landing shock, in-flight buffeting, turbulence, and/or engine-induced three-dimensional vibrations. In certain embodiments, enclosure 110 may be composed of composite graphite fiber, aluminum, or any other suitable material or combination of materials. In certain embodiments, enclosure 110 is secured to a vehicle. For example, enclosure 110 may be bolted to an airframe of an aircraft.

Enclosure 110 may include a seal. In some embodiments, the seal (e.g., a hermetic seal) is configured to exclude or minimize the passage of contaminants (e.g., fuel vapor, water vapor, sand, dust) into the interior of enclosure 110. In certain embodiments, the seal may allow for the adjustment of the internal pressure of enclosure 110 to equilibrate with the altitude of an aircraft. For example, the seal may include a filter pack configured to clean the air as it passes through.

In the illustrated embodiment of FIG. 1, enclosure 110 of gimbal assembly 100 rotates about a first axis 160. First axis 160 may have two degrees of freedom, wherein the first degree of freedom is for low-rate gross displacements and the second degree of freedom is for high-rate fine displacements. In some embodiments, enclosure may rotate 360 degrees in azimuth. In certain embodiments, enclosure 110 is configured to rotate in both a counterclockwise and clockwise direction. Alternatively, enclosure 110 may be configured to rotate either in a counterclockwise or clockwise direction. Gimbal assembly may include a motor (not illustrated) to facilitate the rotation of enclosure 110 about first axis 160.

In certain embodiments, pivot assembly 150 of gimbal assembly 100 rotates about first axis 160. For example, enclosure 110 may remain fixed while pivot assembly 160 rotates 360 degrees in azimuth. In certain embodiments, pivot assembly 150 rotates in both a counterclockwise and clockwise direction. Alternatively, pivot assembly 150 may be configured to rotate either in a counterclockwise or clockwise direction. Gimbal assembly may include a motor (not illustrated) to facilitate the rotation of pivot assembly 150 about first axis 160.

Gimbal assembly 100, as shown in FIG. 1, further includes window frame 120. Window frame 120 is any frame configured to support window 130. In certain embodiments, window frame 120 is coupled to enclosure 110. In some embodiments, window frame 120 may be integrated with enclosure 110. For example, window frame 120 and enclosure 110 may be manufactured as one component. Window frame 120 may be composed of any suitable material (e.g., steel, aluminum, or a combination thereof).

Gimbal assembly 100 of FIG. 1 further includes window 130. Window 130 may be any window operable to receive light 125. Further, window 130 may be any shape. In certain embodiments, the shape of window 130 is the enclosing footprint of all possible angles for the passage of light 125 that can be sensed by the one or more sensors of gimbal assembly 100. In the illustrated embodiment, window 130 is the shape of a rounded rectangle, wherein window 130 is centered on first axis of rotation 160. In some embodiments, window 130 may include two hemispherical windows, wherein window frame 120 divides the two hemispherical windows. In some embodiments, window 130 is off-center from first axis of rotation 160 and is irregular in shape.

As illustrated in FIG. 1, gimbal assembly 100 may include pivot assembly 150. In some embodiments, pivot assembly 150 is coupled to an interior portion of enclosure 110 and is configured to pivot within enclosure 110 about a second axis 170. In some embodiments, pivot assembly 150 may utilize one or more guide rails 140. For example, pivot assembly 150 may utilize a guide rail 140 on each side of pivot assembly 150. Guide rails 140 may be made of hardened steel, aluminum, or any other material or combination of materials operable to assist the rotation of pivot assembly 150. In certain embodiments, guide rails 140 may limit the range of motion of pivot assembly 150. For example, guide rails may limit pivot assembly 150's maximum range of motion to 45 degrees. As another example, guide rails may limit pivot assembly 150's maximum range of motion to 50 degrees.

Pivot assembly 150 may include any components that permit pivot assembly 150 to pivot about second axis 170 within enclosure 110. For example, pivot assembly 150 may include a rotating member (e.g., a metal rod) along second axis 170 that includes a first end and a second end, wherein the first end and the second end are connected to window frame 120 by a first joint and a second joint, respectively. In certain embodiments, each joint allows the rotating member to rotate but prevents the rotating member from vertical and/or lateral displacement. In the illustrated embodiment of FIG. 1, second axis 170 is perpendicular to first axis 160 but does not intersect first axis 160.

Figure 2:
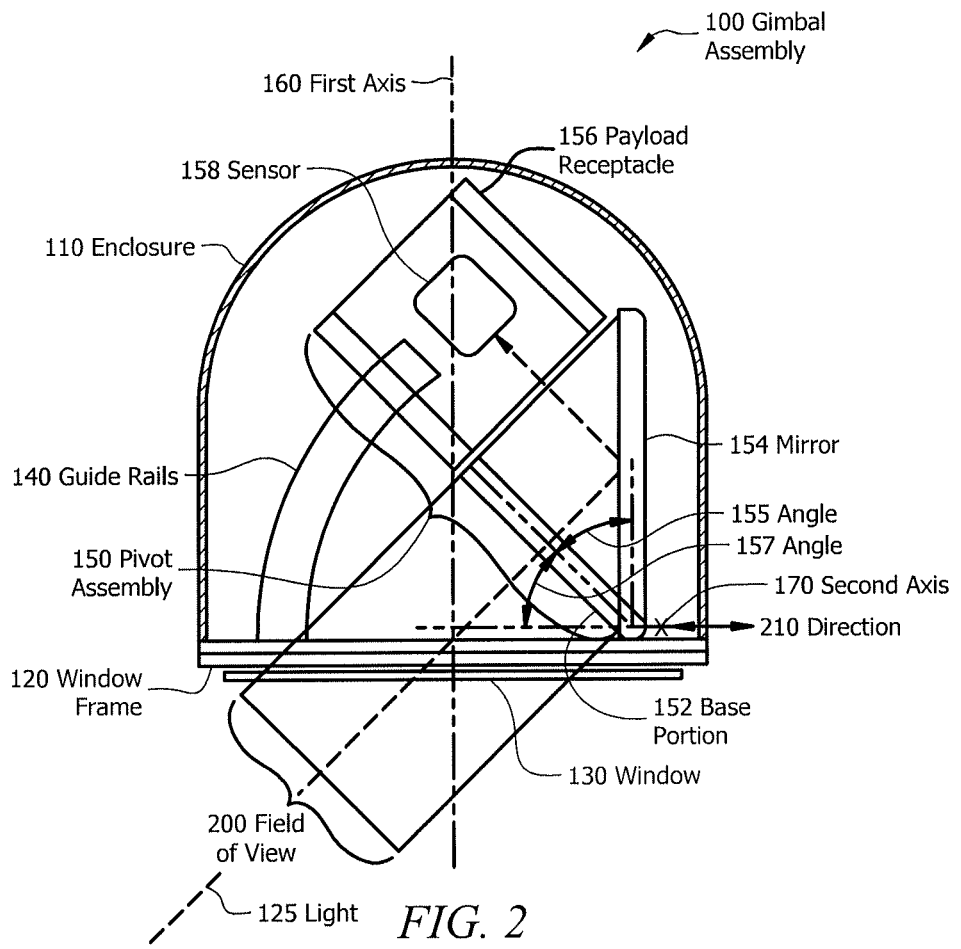
FIG. 2 illustrates another elevation view of the gimbal assembly of FIG. 1, according to certain embodiments.

In certain embodiments, pivot assembly 150 includes a base portion 152, a mirror 154, a payload receptacle 156, and a sensor 158. In the illustrated embodiment of FIG. 1, base portion 152 includes a first end and a second end, wherein the first end is coupled to guide rails 140 and the second end is proximate to second axis 170. In some embodiments, base portion 170 is configured to pivot about second axis 170 within enclosure 110 as illustrated in FIG. 2.

As shown in the illustrated embodiment of FIG. 1, mirror 154 is coupled to base portion 152 at second axis 170. Mirror 154 is any object with a reflective surface. For example, mirror 154 may be an optical mirror used to reflect light 125. In some embodiments, mirror 154 is coupled at an angle 155 to base portion 152. For example, mirror 154 may be coupled at an angle 155 of approximately 45 degrees to base portion 152. In certain embodiments, angle 155 between mirror 154 and base portion 152 remains fixed as mirror 154 and base portion 152 pivot about second axis 170.

Pivot assembly 150 may further include payload receptacle 156, as illustrated in the embodiment of FIG. 1. Payload receptacle 156 is any receptacle configured to house sensor 158. Sensor 158 is any sensor configured to receive light 125. For example, sensor 158 may be a physical light sensor configured to receive light 125 reflected by mirror 154. The type of sensor 158 may determine the type of window 130 selected for gimbal assembly 100. For example, gimbal assembly 100 including infrared sensor 158 may include window 130 that allows the passage of infrared wavelengths. In some embodiments, pivot assembly 150 includes multiple sensors 158, and payload receptacle 156 is configured to house the multiple sensors.

In some embodiments, payload receptacle 156 is removably coupled to base portion 152. For example, a first payload receptacle 156a housing a first sensor 158a may be replaced with a second payload receptacle 156b housing a second sensor 158b. In certain embodiments, sensor 158 may be removably coupled to payload receptacle 156. For example, sensor 158a of payload receptacle 156 may be replaced with sensor 158b. As another example, a first combination of sensors 158a, 158b, and 158c housed in payload receptacle 156 may be replaced with a second combination of sensors 158d, 158e, and 158f.

In certain embodiments, payload receptacle 156 includes a first end and a second end, wherein the first end of payload receptacle 156 is coupled to base portion 152 and the second end of payload receptacle 156 is coupled to mirror 154. Payload receptacle 156 may be configured to pivot within enclosure 110 about second axis 170. In some embodiments, payload receptacle 156, base portion 152, and mirror 154 remain fixed relative to each other as pivot assembly 150 pivots about second axis 170.

In the illustrated embodiment of FIG. 1, base portion 152 of pivot assembly 150 is flush with window frame 120 and window 130, payload receptacle 156 is flush with and perpendicular to base portion 152, and mirror 154 is at a 45 degree angle 155 to base portion 152. At a moment in time, mirror 154 receives light 125 through window 130, and sensor 158 of payload receptacle 156 receives light 125 reflected by mirror 154.

In some embodiments, window frame 120 and window 130 restrain pivot assembly 150 from rotating in a counterclockwise direction. However, pivot assembly 150 is free to rotate in a clockwise direction within enclosure 110. The clockwise rotation of pivot assembly 150 is restrained to a maximum of 45 degrees in the position shown in the illustrated embodiment of FIG. 1. In certain embodiments, the rotation of pivot assembly 150 about second axis 170 is limited by the available space of enclosure 110. A 360 degree rotation of enclosure 110 about first axis 160 in combination with a degree rotation of pivot assembly 150 about second axis 170 provide sensor 158 with an unobstructed 90 degree field of regard. In certain embodiments, pivot assembly 150 is operable to pivot more than 45 degrees, as described below in FIG. 2.

Field of view 180 is the extent of light passing through window 130 that can be reflected by mirror 154 and received by sensor 158 at any given time. In certain embodiments, field of view 180 may be represented by an angle through which sensor 158 can detect light 125. In the illustrated embodiment of FIG. 1, field of view 180 is dependent on the position of pivot assembly 150 within enclosure 110. For example, field of view 180 changes as pivot assembly 150 pivots about second axis 170.

In certain embodiments, gimbal assembly 100 further includes a computer system 190. Computer system 190 may include one or more processors 192, one or more memory units 194, and one or more interfaces 196. Processor 192 may control one or more functions of gimbal assembly 100. For example, processor 192 may control the rotation of enclosure 110 about first axis 160. As another example, processor 192 may control the rotation of pivot assembly 150 about second axis 170. In some embodiments, computer system 190 may be configured to communicate with one or more computer systems external to gimbal assembly 100. Certain embodiments of computer system 190 are discussed in more detail in reference to FIG. 5 below.

FIG. 2 illustrates an elevation view of gimbal assembly 100 after pivoting pivot assembly 150 to an angle 157 of 45 degrees, according to certain embodiments. As shown in FIG. 2, base portion 152 of pivot assembly 150 is at a 45 degree angle 157 to window frame 120 and window 130, payload receptacle 156 is perpendicular to base portion 152, and mirror 154 is at a 45 degree angle 155 to base portion 152 such that mirror 154 is perpendicular to window frame 120 and window 130. At a moment in time, mirror 154 receives light 125 through window 130, and sensor 158 of payload receptacle 156 receives light 125 reflected by mirror 154. In the illustrated embodiment of FIG. 2, pivot assembly 150 is free to rotate counterclockwise 45 degrees such that base portion 152 is flush with window frame 120 and window 130.

As shown in the embodiment of FIG. 2, pivot assembly 150 is configured to move within enclosure 110 in a direction 210 that is perpendicular to first axis 160. This allows second axis 170 to shift along direction 210. In certain embodiments, pivot assembly 150 is configured to slide relative to window frame 120 and window 130. Any suitable translation device may be used to facilitate the movement of pivot assembly 150 along direction 210. For example, pivot assembly 150 may slide along one or more tracks or v-grooves connected to window frame 120. As another example, the translation of pivot assembly 150 along window frame 120 may be facilitated by a linear screw. In some embodiments, the translation device of gimbal assembly 100 is a rack and pinion device. In certain embodiments, the translation device reduces or eliminates backlash and/or jitter of pivot assembly 150.

The shifting of second axis 170 along direction 210 enables pivot assembly 150 to pivot more than 45 degrees.

As pivot assembly 150 shifts along direction 210 in order to move second axis 170 away from enclosure 110, space is created between mirror 154 and enclosure 110. In certain embodiments, the distance of this shift of pivot assembly 150 along direction 210 is directly proportional to angle 157. For example, as pivot assembly 150 shifts 0.5 inches along direction 210 from second axis 170 toward first axis 160, maximum angle 157 increases by an increment of 11.25 degrees from 45 degrees to 56.25 degrees. Similarly, as pivot assembly 150 shifts an additional 0.5 inches (1 inch total) along direction 210 from second axis 170 toward first axis 160, maximum angle 157 increases by an additional increment of 11.25 degrees from 56.25 degrees to 67.5 degrees, and so on.

This created space between mirror 154 and enclosure 110 that allows pivot assembly 150 to pivot beyond 45 degrees enables a wider field of regard (e.g., 110 degrees). A 360 degree rotation of enclosure 110 about first axis 160 in combination with a 55 degree pivot of pivot assembly 150 about second axis 170 may provide sensor 158 with a 110 degree field of regard with 50 percent obscuration. For example, field of view 200 may be unobstructed by window frame 120 when angle 157 is at 45 degrees. When angle 157 increases to 55 degrees, half of field of view 200 may be obstructed by window frame 120, resulting in 50 percent obscuration.

Field of view 200 is the extent of light passing through window 130 that can be reflected by mirror 154 and received by sensor 158 at any given time. In certain embodiments, field of view 200 may be represented by an angle through which sensor 158 can detect light 125. In the illustrated embodiment of FIG. 1, field of view 200 is dependent on the position of pivot assembly 150 within enclosure 110. For example, field of view 200 changes as pivot assembly 150 pivots about second axis 170. As another example, field of view 200 changes as pivot assembly 150 rotates about first axis 160.

Figure 3:
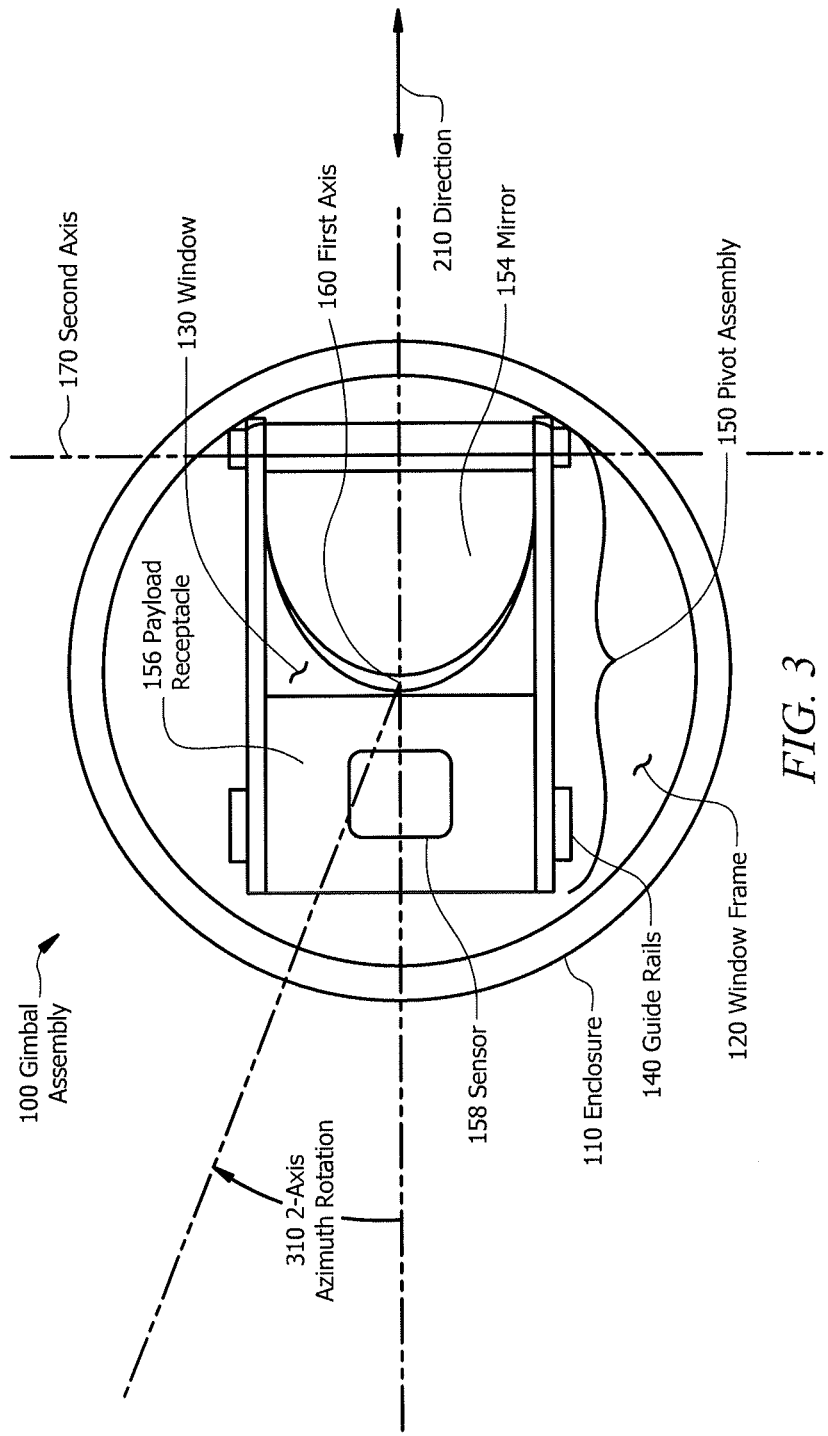
FIG. 3 illustrates a plan view of the gimbal assembly of FIG. 1, according to certain embodiments.

FIG. 3 illustrates a plan view of gimbal assembly 100, according to certain embodiments. In the illustrated embodiment of FIG. 3, enclosure 110 is centered on first axis of rotation 160, wherein one or more components of gimbal assembly 100 are configured to rotate 360 degrees in azimuth about first axis 160. In certain embodiments, gimbal assembly 100 is designed with two degrees of freedom for each axis (e.g., 2-axis azimuth rotation 310) for stability purposes, wherein the first degree of freedom is for low-rate gross displacements and the second degree of freedom is for high-rate fine displacements. Pivot assembly 150 is further configured to pivot within enclosure 110 about second axis 170 using guide rails 140. The 360 degree rotation of enclosure 110 about first axis 160 in combination with the 45 degree pivot of pivot assembly 150 about second axis 170 provide sensor 158 with an unobstructed field of regard.

Pivot assembly 150 of the illustrated embodiment of FIG. 3 is configured to move within enclosure 110 in direction 210 that is perpendicular to first axis 160. As pivot assembly 150 moves along direction 210 such that second axis 170 moves away from enclosure 110, the space between payload receptacle 156 and enclosure 110 is reduced and the space between the base of mirror 154 and enclosure 110 is increased, enabling mirror 154 to rotate greater than 45 degrees within enclosure 110.

Figure 4:
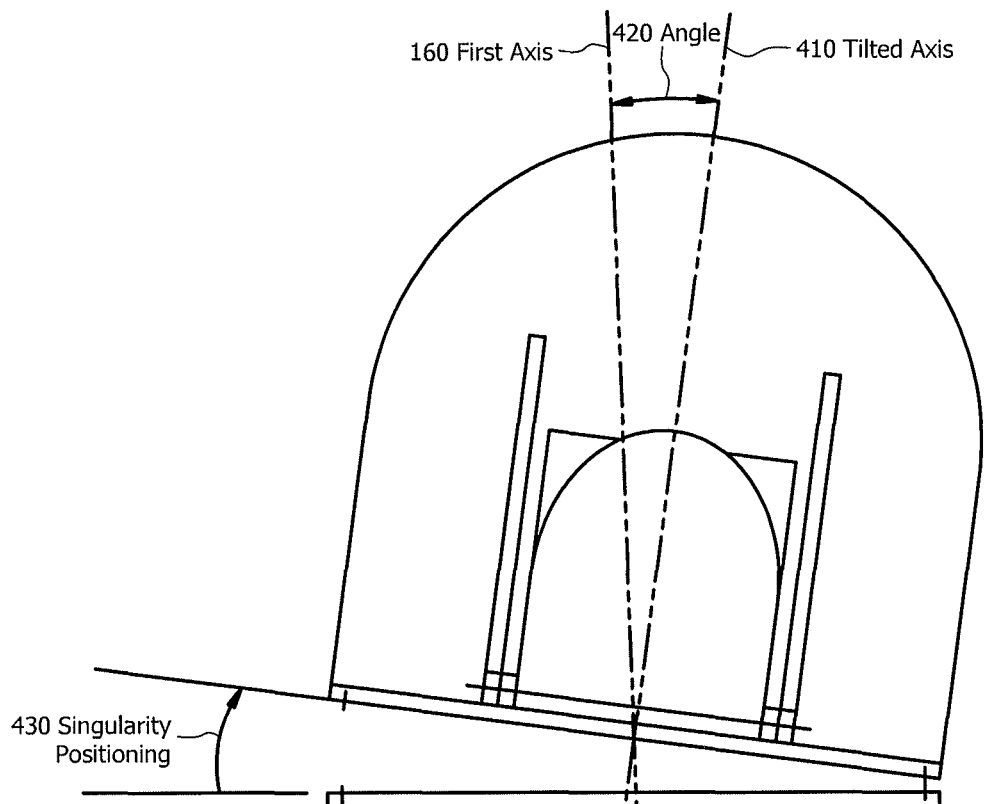
FIG. 4 illustrates a tilted axis of the gimbal assembly of FIG. 1, according to certain embodiments.

FIG. 4 illustrates a tilted axis 410 of gimbal assembly 100, according to certain embodiments. As illustrated in the embodiment of FIG. 4, enclosure 110 is configured to tilt such that one or more components of gimbal assembly 100 rotate 360 degrees about tilted axis 410 rather than about first axis 160. In certain embodiments, enclosure 110 is configured to tilt to avoid gimbal lock (e.g., a singularity point). Angle 420 between first axis 160 and tilted axis 410 may be any angle operable to avoid gimbal lock. As an example, angle 420 may be 5 degrees.

In certain embodiments, when gimbal assembly 100 is positioned such that the field of view 200 is perpendicular to window 130, this position is a singularity point where one or more components of gimbal assembly 100 must rotate in azimuth at a high rate to allow field of view 200 to pass through that point. By changing the angle of first axis 160, the position of the singularity point may change to allow a lower rotation rate in azimuth for field of view 200 to pass through that point. To mechanize tilted axis 410, actuators may separate the plane of the azimuth rotation from a mounting surface (e.g., a mounting surface of an aircraft), which results in singularity positioning 430.

In operation, gimbal assembly 100 is installed on an aircraft platform and tracks an object (e.g., a moving object) by detecting light 125 (e.g., a wavelength) associated with the object. In some embodiments, light 125 passes through window 130 and is reflected by mirror 154. Sensor 158 of gimbal assembly 100 receives reflected light 125 and tracks light 125 by pivoting about first axis 160 and second axis 170. In certain embodiments, pivot assembly 150 shifts along direction 210 to improve the field of regard of sensor 158.

Modifications, additions, or omissions may be made to the embodiments depicted in FIGS. 1 through 4. The embodiments may include more, fewer, or other components. For example, in addition to the components shown in FIGS. 1-4, gimbal assembly 100 may include one or more motors. As another example, the maximum degree of rotation of enclosure 110 about first axis 160 may be less than 360 degrees, and pivot assembly 150 may be operable to pivot more or less than 45 degrees about second axis 170.

Figure 5:
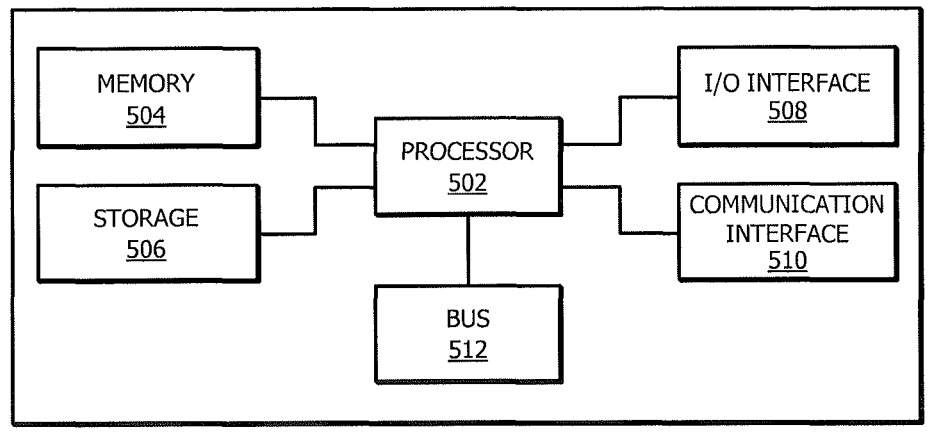
FIG. 5 illustrates a computer system that may be used to control the gimbal assembly of FIG. 1, according to certain embodiments.

FIG. 5 illustrates a computer system of gimbal assembly 100, according to certain embodiments. One or more computer systems 500 (e.g., computer system 190) perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502 (e.g., processor 192) memory 504 (e.g., memory 194), storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memory units 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

The components of computer system 500 may be integrated or separated. In some embodiments, components of computer system 500 may each be housed within a single chassis. The operations of computer system 500 may be performed by more, fewer, or other components. Additionally, operations of computer system 500 may be performed using any suitable logic that may include software, hardware, other logic, or any suitable combination of the preceding.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A gimbal assembly, comprising:
   an enclosure centered on a first axis;
   a window frame coupled to the enclosure;
   a window centered on the first axis and coupled to the window frame of the enclosure;
   one or more guide rails coupled within the enclosure to an interior portion of the enclosure; and
   a pivot assembly coupled to the interior portion of the enclosure and configured to pivot within the enclosure about a second axis using the one or more guide rails, the second axis being perpendicular to the first axis, the pivot assembly comprising:
   a base portion;
   a mirror coupled at an angle to the base portion and configured to reflect light received through the window; and
   a sensor removably coupled to the base portion and configured to receive the light reflected by the mirror;
   wherein:
   the second axis is located proximate to an end of the base portion and proximate to an end of the mirror; and
   the pivot assembly is further configured to:

move within the enclosure in a direction that is perpendicular to the first axis; and
rotate about the first axis.

2. The gimbal assembly of claim 1, wherein the pivot assembly is further configured to:
rotate 360 degrees about the first axis; and
pivot 45 degrees within the enclosure about the second axis.

3. The gimbal assembly of claim 1, wherein a 360 degree rotation of the pivot assembly about the first axis in combination with a 45 degree rotation of the pivot assembly about the second axis provide the sensor with an unobstructed 90 degree field of regard.

4. The gimbal assembly of claim 1, wherein the first axis does not intersect the second axis.

5. The gimbal assembly of claim 1, wherein the first axis of rotation is configured to tilt to avoid gimbal lock.

6. A gimbal assembly, comprising:
an enclosure configured to rotate about a first axis;
a window coupled to the enclosure; and
a pivot assembly coupled to an interior portion of the enclosure and configured to pivot within the enclosure about a second axis, the second axis being perpendicular to the first axis, the pivot assembly comprising:
a base portion;
a mirror coupled at an angle to the base portion and configured to reflect light received through the window; and
a sensor configured to receive the light reflected by the mirror, and
further comprising one or more guide rails coupled within the enclosure to an interior portion of the enclosure.

7. The gimbal assembly of claim 6, wherein the enclosure is configured to rotate 360 degrees about the first axis and the pivot assembly is configured to pivot 45 degrees within the enclosure about the second axis.

8. The gimbal assembly of claim 6, wherein a 360 degree rotation of the enclosure about the first axis in combination with a 45 degree rotation of the pivot assembly about the second axis provide the sensor with an unobstructed 90 degree field of regard.

9. The gimbal assembly of claim 6, wherein the first axis does not intersect the second axis.

10. The gimbal assembly of claim 6, wherein the first axis of rotation is configured to tilt to avoid gimbal lock.

11. The gimbal assembly of claim 6, wherein the pivot assembly is configured to move within the enclosure in a direction that is perpendicular to the first axis.

12. The gimbal assembly of claim 6, wherein the second axis is located proximate to an end of the base portion and proximate to an end of the mirror.

13. A gimbal assembly, comprising:
a pivot assembly configured to be coupled to an interior portion of an enclosure, the pivot assembly further configured to rotate about a first axis and to pivot within the enclosure about a second axis, the pivot assembly comprising:
a base portion;
a mirror coupled at an angle to the base portion and configured to reflect light received through a window of the enclosure;
a payload receptacle configured to house a sensor for receiving the light reflected by the mirror, and
wherein the second axis is located proximate to an end of the base portion and proximate to an end of the mirror.

14. A gimbal assembly, comprising:
a pivot assembly configured to be coupled to an interior portion of an enclosure, the pivot assembly further configured to rotate about a first axis and to pivot within the enclosure about a second axis, the pivot assembly comprising:
a base portion;
a mirror coupled at an angle to the base portion and configured to reflect light received through a window of the enclosure;
a payload receptacle configured to house a sensor for receiving the light reflected by the mirror; and
wherein the pivot assembly is configured to:
rotate 360 degrees about the first axis; and
pivot 45 degrees within the enclosure about the second axis.

15. The gimbal assembly of claim 13, wherein a 360 degree rotation of the pivot assembly about the first axis in combination with a 45 degree rotation of the pivot assembly about the second axis provide the sensor with an unobstructed 90 degree field of regard.

16. The gimbal assembly of claim 13, wherein the first axis does not intersect the second axis.

17. The gimbal assembly of claim 13, wherein the first axis of rotation is configured to tilt to avoid gimbal lock.

18. The gimbal assembly of claim 13, the pivot assembly further configured to move within the enclosure in a direction that is perpendicular to the first axis.

* * * * *